(12) United States Patent
Duke

(10) Patent No.: US 6,436,283 B1
(45) Date of Patent: Aug. 20, 2002

(54) PORTABLE RAINWATER COLLECTING AND PURIFYING SYSTEM

(76) Inventor: Eddie D. Duke, P.O. Box 296, Tenaha, TX (US) 79574

( * ) Notice: Subject to any disclaimer, the term of this patent is extended or adjusted under 35 U.S.C. 154(b) by 0 days.

(21) Appl. No.: 09/517,105

(22) Filed: Mar. 7, 2000

(51) Int. Cl.[7] .............................. C02F 1/32; C02F 9/02; C02F 9/12
(52) U.S. Cl. .................. 210/172; 210/175; 210/196; 210/241; 210/246; 210/244; 210/259; 210/748
(58) Field of Search ....................... 210/172, 257.1, 210/241, 196, 416.3, 244, 246, 232, 205, 259, 748, 175

(56) References Cited

U.S. PATENT DOCUMENTS

| | | | |
|---|---|---|---|
| 620,316 A | * | 2/1899 | Haselden |
| 1,059,935 A | * | 4/1913 | Guderian |
| 1,274,227 A | * | 7/1918 | Woodson et al. |
| 3,498,457 A | * | 3/1970 | Gough |
| 4,317,733 A | * | 3/1982 | Xhonneux |
| 4,615,153 A | | 10/1986 | Carey |
| 4,659,460 A | * | 4/1987 | Muller et al. |
| 4,700,734 A | | 10/1987 | McCauley |
| 4,849,100 A | * | 7/1989 | Papandrea |
| 5,301,474 A | | 4/1994 | Carey |
| 5,632,892 A | * | 5/1997 | Klein |
| 5,873,996 A | | 2/1999 | Rozelle |
| 5,985,158 A | | 11/1999 | Tideringtou |
| 5,997,750 A | | 12/1999 | Rozelle |

FOREIGN PATENT DOCUMENTS

| | | | |
|---|---|---|---|
| DE | 3842226 | * | 12/1990 |
| DE | 4036598 | * | 5/1991 |
| DE | 2961859 | * | 11/1996 |
| FR | 2644812 | * | 9/1990 |
| JP | 02-197628 | * | 8/1990 |
| JP | 09-066295 | * | 3/1997 |
| JP | 09-234496 | * | 9/1997 |

* cited by examiner

Primary Examiner—Thomas M. Lithgow
(74) Attorney, Agent, or Firm—John M Harrison

(57) ABSTRACT

A self-contained, portable rainwater collecting and purifying system for collecting, filtering and disinfecting rainwater or other precipitation primarily for drinking purposes. In a preferred embodiment the portable rainwater collecting and purifying system is characterized by a housing which contains the system components. The bottom of the housing is typically fitted with skids or wheels, and a pair of sloped water collection panels is typically hinged to the housing for receiving the falling rainwater. A collection gutter receives the rainwater from the panels and drains the rainwater into a vertical standpipe fitted with a typically screen filter or filters. As the rising water in the standpipe eventually overflows, the overflowing, partially filtered water leaves the standpipe and enters a water collection tank through a hopper typically fitted with a gravity-flow filter or filters. A typically battery-operated pump automatically pumps the water through a pair of particle filters which remove dirt and other particulate impurities from the water, and finally through an ultraviolet light sterilizer which kills bacteria and other microorganisms to render the water suitable for drinking. In another embodiment solar panels provided on the respective water collection panels collect solar energy for energizing the pump, ultraviolet sterilizer or both. In still another embodiment, a heating blanket is provided beneath each water collection panel for heating and melting accumulating snow, sleet or ice on the panels, and the melted precipitation is filtered and disinfected through the system.

36 Claims, 8 Drawing Sheets

PORTABLE RAINWATER COLLECTING AND PURIFYING SYSTEM

BACKGROUND OF THE INVENTION

1. Field of the Invention

This invention relates to rainwater collecting systems and more particularly, to a self-contained, portable rainwater collecting and purifying system for collecting, filtering and disinfecting rainwater or other precipitation primarily for drinking purposes. In a preferred embodiment the portable water collecting and treatment system is characterized by a housing which contains the system components, and the housing is typically fitted on the bottom thereof with a pair of skids which render the housing portable on sand, snow or other soft terrain. Alternatively, wheels can be fitted on the housing for transporting the housing on pavement or hard terrain. A pair of water collection panels typically hinged to the housing can be deployed in a sloped configuration on the top of the housing for receiving falling rainwater. A collection gutter provided on the housing between the panels receives the rainwater from the sloped panels and drains the rainwater into a vertical standpipe. The standpipe, typically fitted with a screen filter or filters which initially removes some of the twigs, leaves and other large debris from the water, eventually overflows due to the rising water in the standpipe. The overflowing, partially-filtered water is distributed to a water collection tank, provided with a hopper which is typically fitted with a gravity-flow prefilter or prefilters. A typically battery-operated pump automatically pumps the water from the water collection tank, first through a typically 20-micron particle filter which removes large particulate impurities from the water, and then through a typically 5-micron particle filter which removes most of the remaining, smaller particulate impurities from the water. The filtered water is finally distributed through an ultraviolet light sterilizer which kills bacteria and other microorganisms to disinfect and render the water suitable for drinking. A header system connected to the ultraviolet light sterilizer is typically fitted with a circulation valve provided in fluid communication with the water collection tank for selectively recirculating the water through the system, under circumstances in which rainwater remains in the collection tank for long periods of time and begins to stagnate, for example. The header system typically further includes a system exit valve for selectively distributing the filtered and disinfected water from the housing, as well as a faucet in the housing for selectively discharging the filtered and disinfected water from the system. In another embodiment solar panels provided on the respective water collection panels collect solar energy for energizing the pump, ultraviolet light sterilizer, or both. In still another embodiment a heating blanket is provided beneath each water collection panel for heating and melting accumulated snow, sleet or ice on the panels, and the melted precipitation is purified and disinfected through the system.

While safe drinking water is a universal requirement for adequate health, millions of people worldwide, particularly those in third world countries, lack an adequate supply of clean drinking water. In many developing and third world countries, population increases have combined with inadequate sewage treatment facilities to render the water of the aquifers or underground wells in those countries unfit for human consumption. As a result, the available drinking water is contaminated with bacteria, viruses and other parasites which can cause potentially fatal diseases, thus profoundly affecting the health of the population. Safe drinking water is also an important requirement for persons affected by natural disasters and military personnel engaged in armed conflicts. Under these circumstances, bottled water must typically be continually trucked or air-dropped into the affected area or areas, and this is a very expensive operation. A substantially untapped source of clean drinking water is rainwater, particularly in tropical or subtropical countries. Accordingly, the portable rainwater collecting and purifying system of this invention is designed to collect falling rainwater or other precipitation such as snow or sleet, and filter and disinfect the collected rainwater such that the treated water is capable of human consumption. The system is self-contained, can be transported from one location to another over soft terrain and is particularly useful in underdeveloped, remote or rural areas, areas affected by drought or disaster or other locations having a limited supply of clean drinking water.

2. Description of the Prior Art

Several different types of filtering devices are known in the art for removing debris, impurities or microorganisms from rainwater, spring water or other natural water sources. U.S. Pat. No. 4,615,153, dated Oct. 7, 1986, to Robert J. Carey, discloses a "Leader Filter" which is designed to be mounted beneath the discharge opening of a rain-collecting gutter on a building. The box-shaped leader filter has a top for receiving the rainwater from the gutter and diverting the rainwater down the outside surfaces of the sides of the leader filter. Multiple horizontal slots provided in the sides of the leader filter allow the rainwater to enter the leader filter, while preventing the entrance of leaves and other debris into the filter. The filtered rainwater, substantially free of leaves and other clogging debris, flows from a filter discharge opening provided in the bottom of the leader filter, into a leader which conveys the water to the ground. A "Water Collecting and Spring Box and Gauging System and Holding Tank" is described in U.S. Pat. No. 4,700,734, dated Oct. 20, 1987, to Robert G. McCauley. The spring box is designed to collect water from a water source, and the water is channeled from the spring box, through a filter to a water holding tank. The flow rate of water from the spring box is controlled by varying the height of the water level in the spring box and by using a filter having openings of selected sizes and spacings. U.S. Pat. No. 5,301,474, dated Apr. 12, 1994, to Jay F. Carey, II, et al., details a "Roofing System for Potable Water", which is assembled on a building for channeling rainwater from the building. The roofing system is characterized by multiple roof pans each constructed of fully-annealed sheets of at least 99% titanium, and each of which has a thickness of less than 0.020 inches. The adjacent roof pans are joined by press-fitting adjacent seam elements of the roof pans into a standing seam which extends along the pitch of the roof and forms a water-collecting trough for gathering potable rain water. A "Removable Downspout Debris Trap Assembly", for use with downspouts connected to a rain gutter system, is disclosed in U.S. Pat. No. 5,985,158, dated Nov. 16, 1999, to Kenneth M. Tiderington. The debris trap assembly replaces a portion of the downspout from about waist height down to the drain tile connection. Rainwater is carried by the downspout to the debris trap assembly, where the rainwater flows through a strainer housing containing a strainer cup which collects debris from the rainwater. The strainer cup is removable through an access opening in the housing for emptying the debris from the cup. U.S. Pat. No. 5,873,996, dated May 3, 1996, and U.S. Pat. No. 5,997,750, dated Dec. 7, 1999, both to Lee Rozelle, et al., each details a "Community Drinking Water Purification System" for producing purified drinking water from surface or ground fresh water sources by using a positively-charged filtration medium to attract the typically negatively-charged solids suspended in the water source. The process, which can be portable, includes a filtration system having filtration, recirculation, backwash and disinfection steps. The process further includes a system controller which receives electrical signals from float controls to control the filtration, recirculation and backwash steps.

An object of this invention is to provide a system for collecting and purifying rainwater or other precipitation primarily for drinking purposes.

Another object of this invention is to provide a self-contained, portable system for collecting, filtering and disinfecting rainwater or other precipitation.

Still another object of this invention is to provide a system for collecting and melting snow, sleet or ice and collecting, filtering and disinfecting the melted precipitation primarily for drinking purposes.

Yet another object of this invention is to provide a solar-powered portable water collecting and treatment system.

A still further object of this invention is to provide a portable rainwater collecting and purifying system characterized by a housing typically fitted with skids or wheels on the bottom thereof and having a pair of water collection panels typically hinged to the housing, which water collection panels can be pivoted from a storage or transport configuration on respective sides of the housing and deployed in a sloped configuration on the housing for receiving falling rainwater or other precipitation; a collection gutter provided on the housing for receiving the rainwater from the sloped panels; a vertical standpipe provided in the housing and typically fitted with a screen filter or filters for receiving the water from the collection gutter and initially filtering twigs, leaves and other large debris from the water; a water collection tank provided in the housing for receiving partially filtered water overflowing from the standpipe and provided with a hopper fitted with a gravity flow prefilter or prefilters for additionally filtering the water; a pair of particle filters provided in fluid communication with the water collection tank for removing additional particulate impurities from the water; an ultraviolet light sterilizer provided in fluid communication with the particle filters for killing bacteria and other microorganisms in the water and disinfecting and rendering the water suitable for drinking; a typically battery-operated pump for automatically pumping the water from the water collection tank through the particle filters and ultraviolet light sterilizer; and a header system connected to the ultraviolet light sterilizer for selectively circulating the filtered and disinfected water through the system, for selectively distributing the water from the housing or for selectively discharging the water from the system through a faucet, as desired.

SUMMARY OF THE INVENTION

These and other objects of the invention are provided in a self-contained, portable rainwater collecting and purifying system for collecting, filtering and disinfecting rainwater or other precipitation primarily for drinking purposes. In a preferred embodiment the portable water collecting and treatment system is characterized by a housing for containing the system components, which housing is typically fitted on the bottom thereof with skids which render the housing portable on sand, snow or other soft terrain. Alternatively, the housing can be fitted with wheels for rendering the housing portable on pavement or hard terrain. A pair of water collection panels typically hinged to the respective sides of the housing can be deployed in a storage configuration on the respective sides of the housing for transportation, or in a sloped configuration on the top of the housing for receiving falling rainwater. A collection gutter provided on the housing between the sloped panels receives the rainwater from the panels and drains the rainwater into a vertical standpipe which is provided in the housing. The standpipe, typically fitted with a screen filter or filters which initially removes leaves, twigs and other large debris from the water, eventually overflows due to the rising water in the standpipe. The overflowing, partially-filtered water is distributed to a water collection tank provided in the housing, which water collection tank is provided with a hopper, typically fitted with a gravity flow prefilter or prefilters. A typically battery-operated pump provided in fluid communication with the water collection tank automatically pumps the water first through a typically 20-micron particle filter which removes large particulate impurities from the water, and then through a typically 5-micron particle filter which removes most of the remaining, smaller particulate impurities from the water, and finally through an ultraviolet light sterilizer which kills bacteria and other microorganisms to disinfect and render the water suitable for drinking. A header system connected to the ultraviolet light sterilizer is typically fitted with a circulation valve provided in fluid communication with the water collection tank for selectively recirculating the water through the system, under circumstances in which rainwater remains in the collection tank and other system components for long periods of time and begins to stagnate, for example. The header system typically further includes a system exit valve for selectively distributing the filtered and disinfected water from the housing to a residence or other destination, as well as a faucet in the housing for selectively discharging the filtered and disinfected water from the system, as desired. In another embodiment solar panels provided on the respective water collection panels collect solar energy for energizing the pump, ultraviolet light sterilizer, or both. In still another embodiment a heating blanket is provided beneath each water collection panel for heating and melting accumulated snow, sleet or ice on the panels, and the melted precipitation is filtered and disinfected through the system.

BRIEF DESCRIPTION OF THE DRAWINGS

The invention will be better understood by reference to the accompanying drawings, wherein.

DESCRIPTION OF THE PREFERRED EMBODIMENTS

Figure 3:
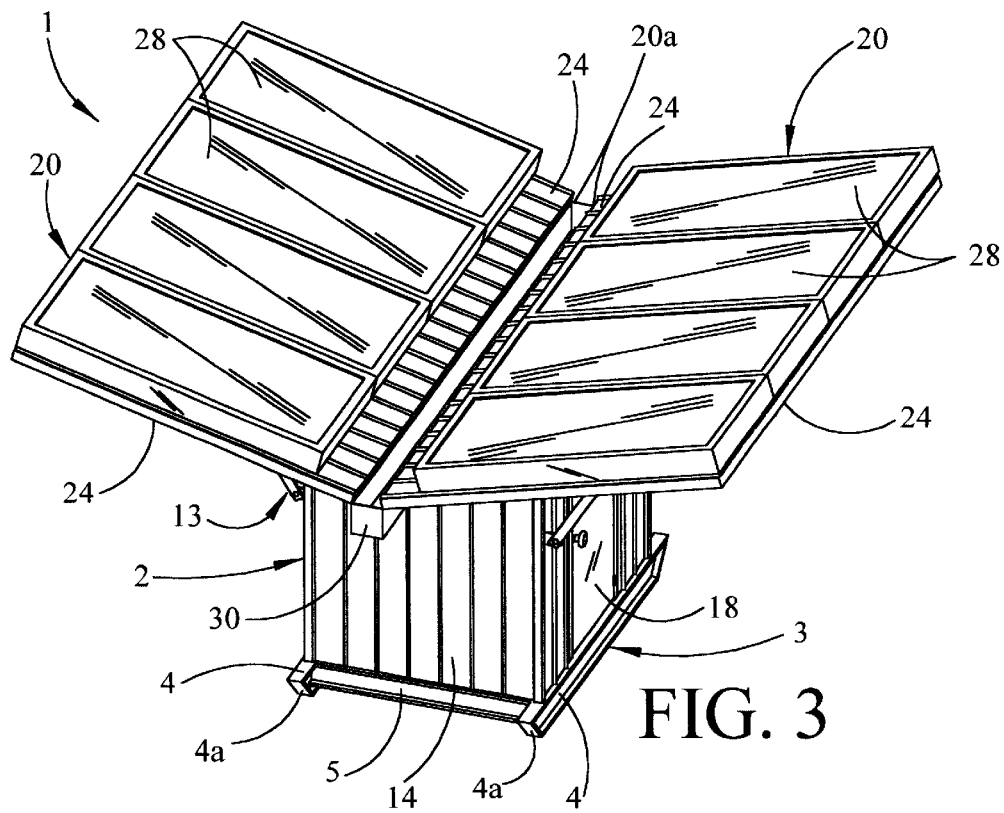
FIG. 3 is a top perspective view of another embodiment of the portable rainwater collecting and purifying system, more particularly illustrating solar panels mounted on the respective rainwater collection panels.
Figure 4:
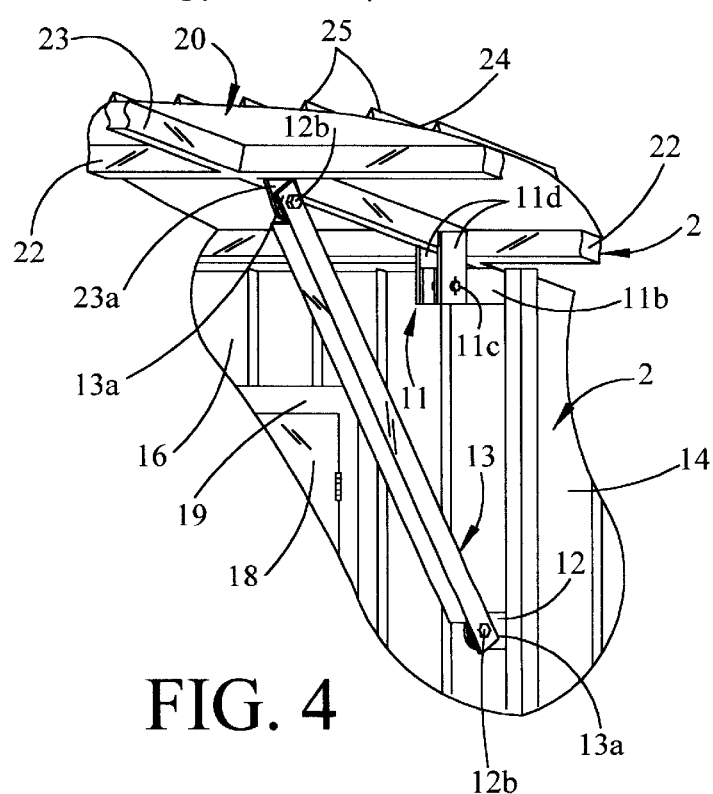
FIG. 4 is a perspective view, partially in section, of the portable rainwater collecting and purifying system illustrated in FIGS. 1 and 2, with one of the rainwater collection panels shown deployed in the sloped, functional configuration on the housing, and a panel support member removably supporting the support panel in the sloped configuration in application of the system.
Figure 5:
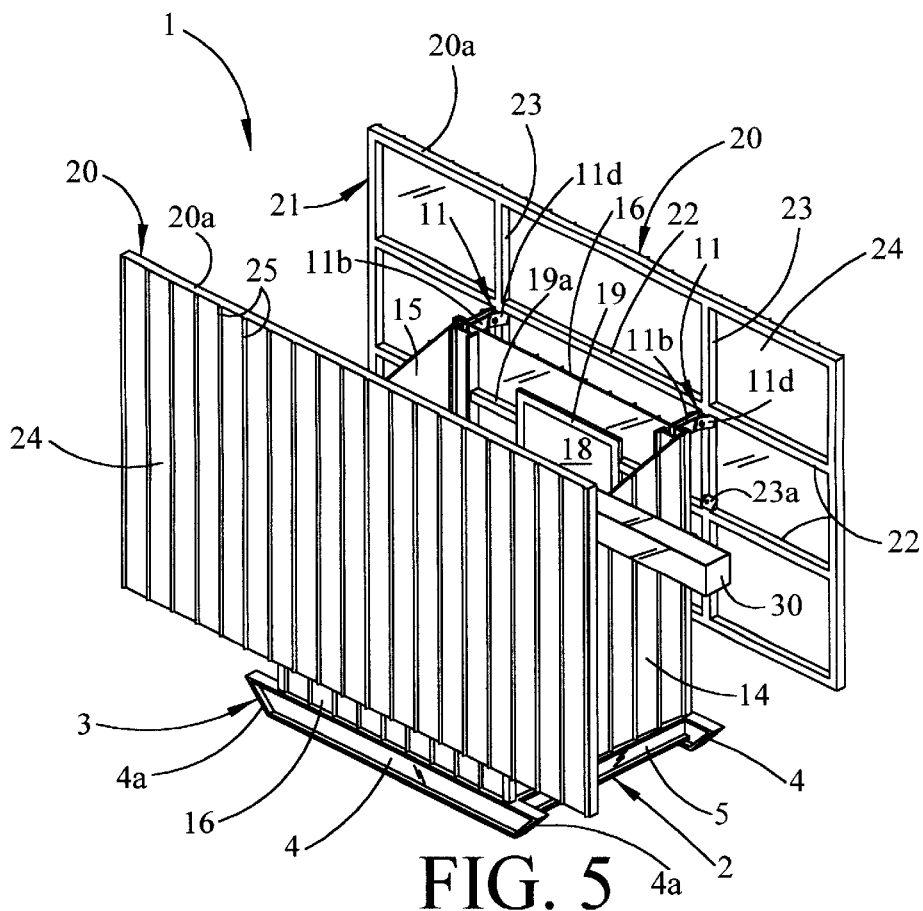
FIG. 5 is a perspective view of the portable rainwater collecting and purifying system illustrated in FIGS. 1 and 2, with the rainwater collection panels deployed on the respective sides of the housing when the system is not in use.
Figure 6:
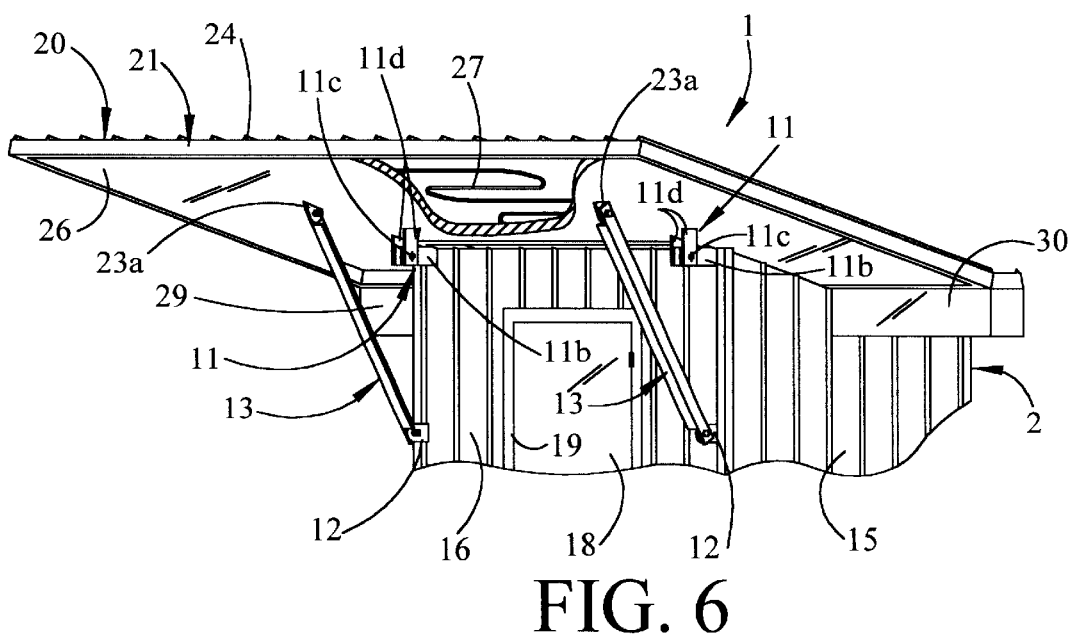
FIG. 6 is a side perspective view, partially in section, of still another embodiment of the portable water collecting and purifying system, more particularly illustrating a heating blanket mounted on the bottom surface of each rainwater collection panel for melting accumulated snow, sleet or ice on the rainwater collection panels.
Figure 7:
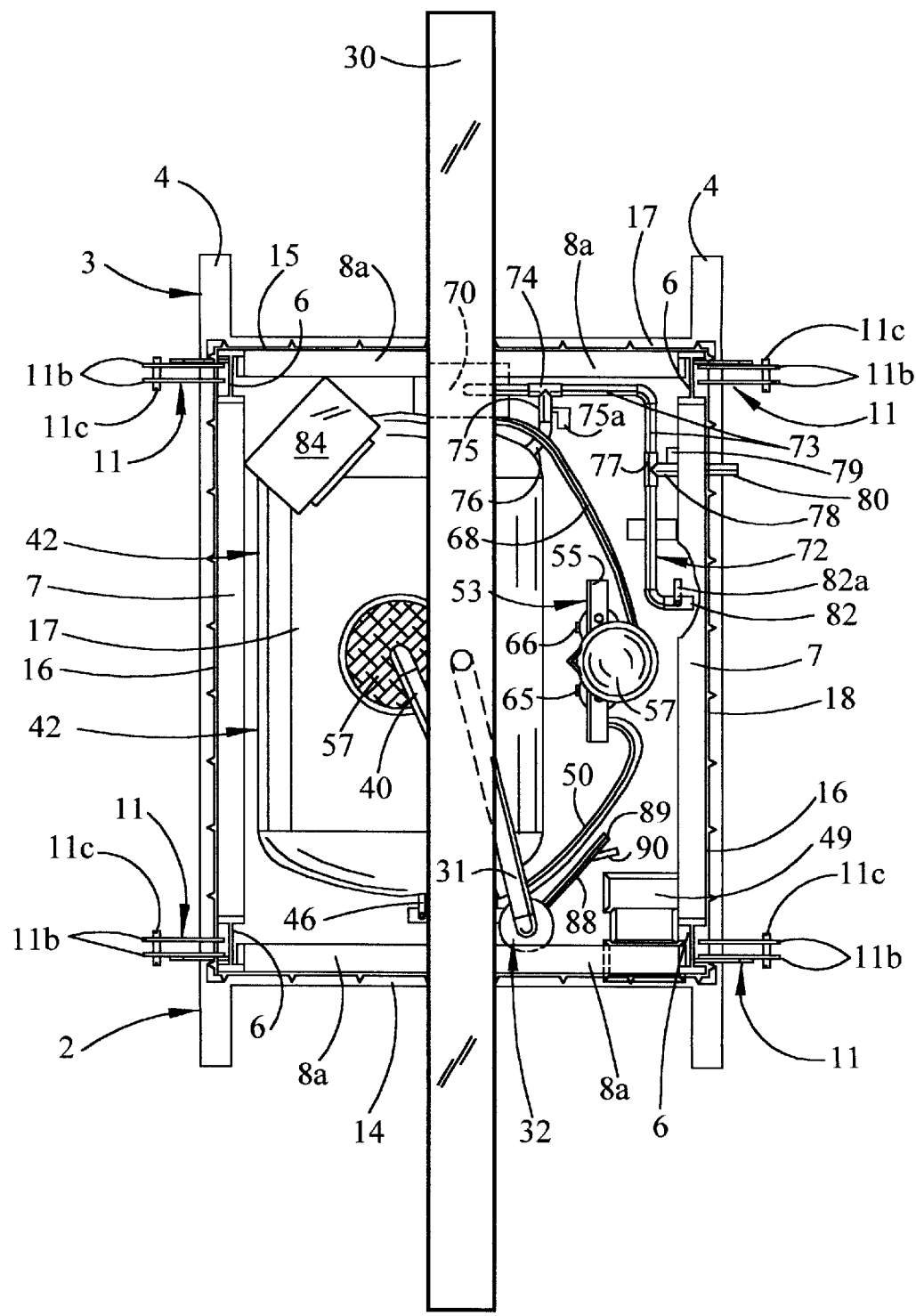
FIG. 7 is a top view of the portable rainwater collecting and purifying system, with the respective rainwater collection panels removed from the housing.
Figure 8:
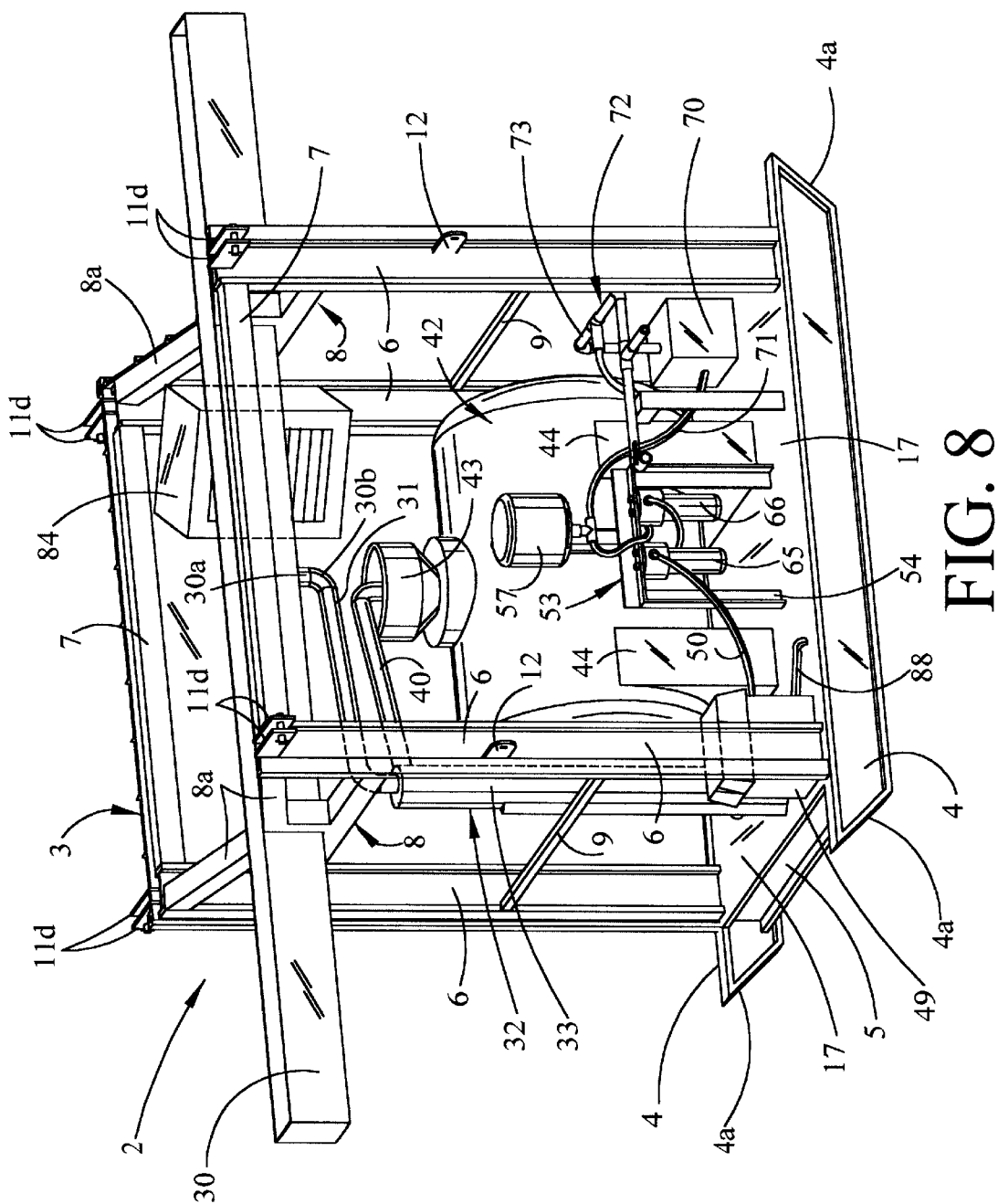
FIG. 8 is a side perspective view of the portable rainwater collecting and purifying system, with the housing panel and water collection panel components removed from the housing, more particularly illustrating the various rainwater filtering and purifying components of the system.
Figure 9:
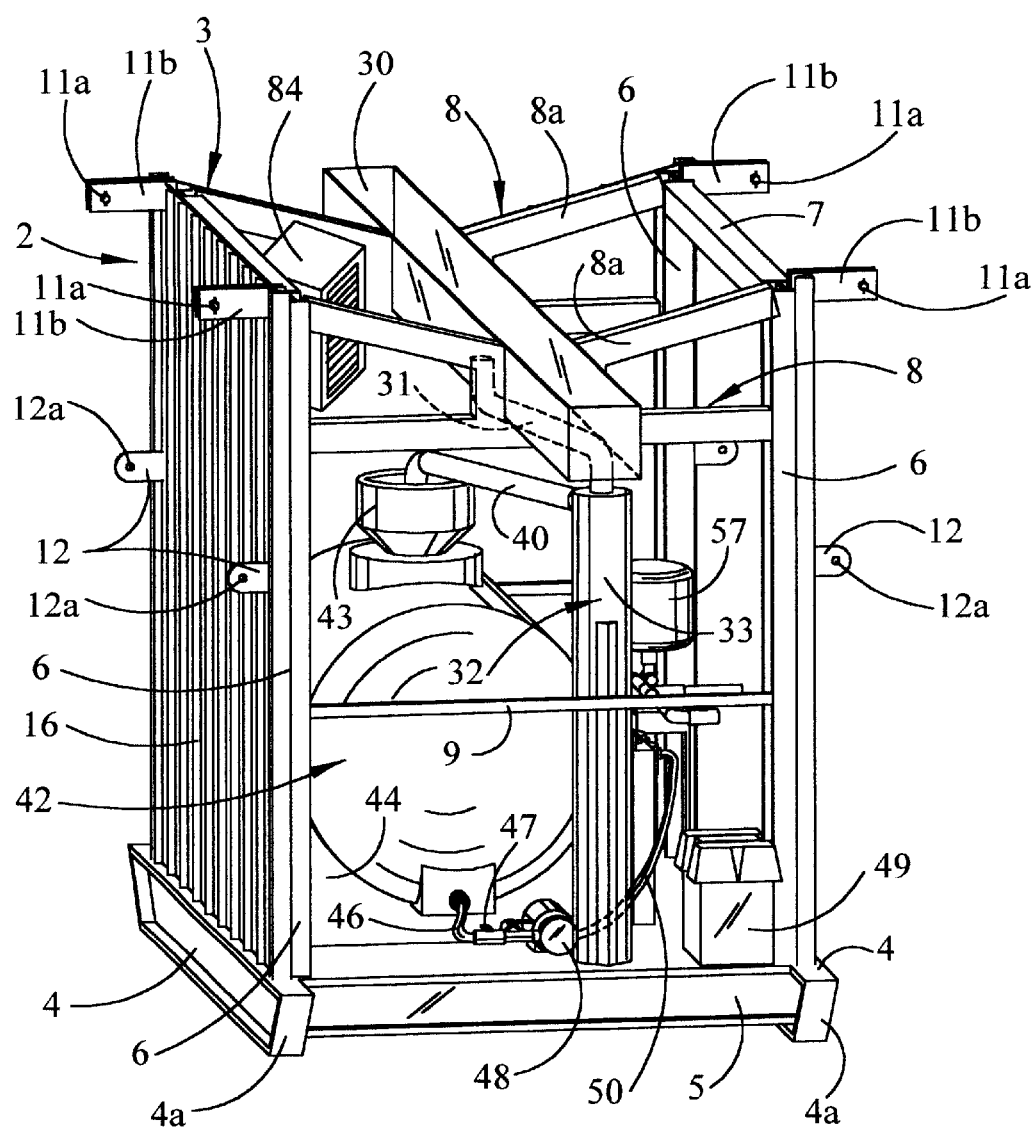
FIG. 9 is a front perspective view of the portable rainwater collecting and purifying system illustrated in FIG. 8, with the rainwater collection panels and front and left side housing panels removed from the housing.

Referring initially to FIGS. 1, 2, 4, 5, and 7–10 of the drawings, in a preferred embodiment the portable water collecting and treatment system of this invention is generally illustrated by reference numeral 1. The portable water collecting and treatment system 1 includes a substantially rectangular system housing 2 which, as illustrated in FIGS. 8 and 9, is characterized by a housing frame 3, typically having a pair of elongated, parallel skids 4 which render the system housing 2 portable on snow, sand or other soft terrain (not illustrated), as hereinafter described. A pair of elongated floor beams 5 spans the parallel skids 4 in spaced, substantially parallel relationship with respect to each other, with each end of each floor beam 5 typically welded to the corresponding skid 4, adjacent to a tapered end 4a thereof A rectangular floor panel 17 is mounted on the supporting skids 4 and floor beams 5. An elongated vertical frame member 6 extends upwardly from the skids 4, at respective corners of the floor panel 17. A horizontal frame member 7 spans the pair of vertical frame members 6 on each side of the housing frame 3, and are typically welded or otherwise attached to the vertical frame members 6 at or adjacent to the upper ends of the respective vertical frame members 6. A horizontal frame brace 9 spans the parallel vertical frame members 6 at the respective ends of the housing frame 3, typically at about the midpoint along the height of the vertical frame members 6. An elongated gutter support 8 in like manner spans the vertical frame members 6, above the corresponding frame brace 9. A pair of generally L-shaped gutter support arms 8a extends upwardly from each gutter support 8, and each gutter support arm 8a terminates on a corresponding vertical frame member 6, the purpose of which gutter support arms 8a will be hereinafter described. As illustrated in FIG. 7, a pair of elongated, substantially rectangular hinge arms 11b of a roof panel hinge 11 extends outwardly from each vertical frame member 6 in spaced, substantially parallel relationship to each other, adjacent to the upper end of the corresponding vertical frame member 6. A hinge pin 11c extends through aligned pin openings 11a (FIG. 9) provided in the respective hinge arms 11b, as well as a pair of rectangular hinge plates 11d of each roof panel hinge 11, as illustrated in FIG. 6, such that the hinge plates 11d are pivotally mounted on the hinge pins 11c of the respective roof panel hinges 11 for purposes which will be hereinafter described. As illustrated in FIG. 9, a panel support flange 12, having a pin opening 12a extending therethrough, extends from each vertical frame member 6, beneath the corresponding pair of hinge arms 11b, for purposes which will be hereinafter described. As illustrated in FIGS. 1–3 and 7, a front housing panel 14 and a rear housing panel 15 are mounted on the respective pairs of parallel vertical frame members 6, at the respective ends of the housing frame 3. Side housing panels 16 are in like manner mounted on the respective pairs of vertical frame members 6, on the respective sides of the housing frame 3. A door 18, hingedly mounted in a door frame 19 mounted between a set of door frame braces 19a of the housing frame 3, as illustrated in FIG. 5, is typically used for selectively accessing the interior of the system housing 2, as hereinafter described.

Figure 1:
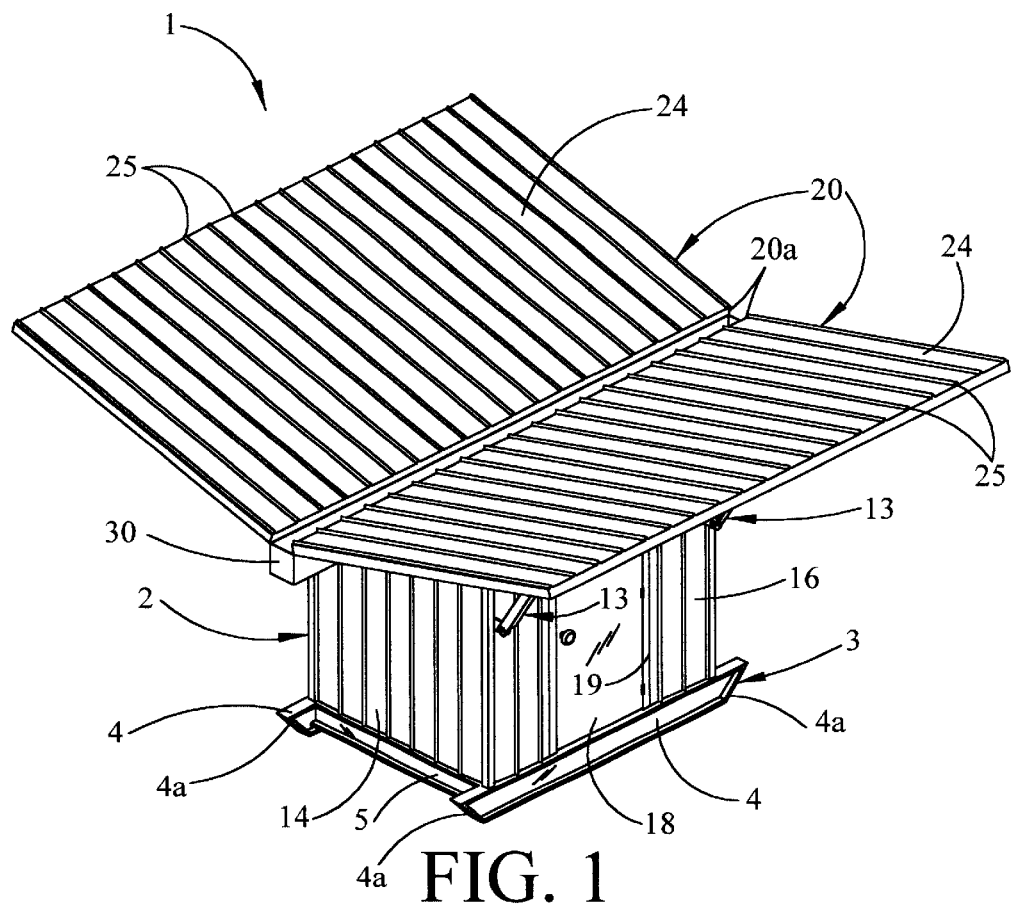
FIG. 1 is a top perspective view of a preferred embodiment of the portable rainwater collecting and purifying system of this invention, with the rainwater collection panels of the system deployed in the sloped, functional, rainwater-collecting configuration on the system housing in typical application of the system.
Figure 2:
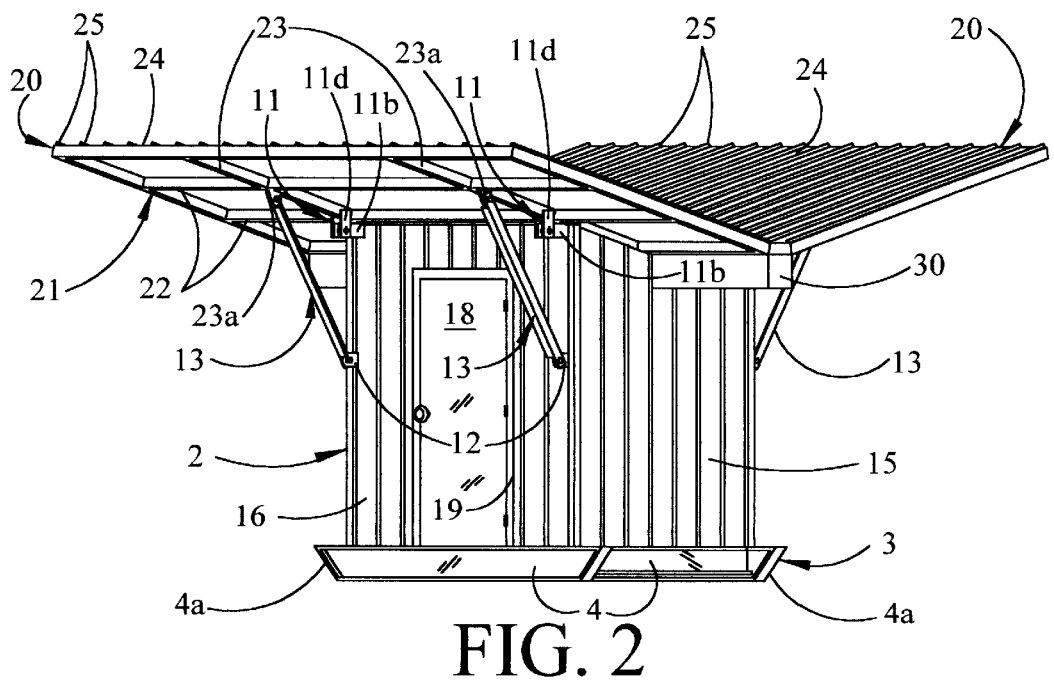
FIG. 2 is a side perspective view of the portable rainwater collecting and purifying system illustrated in FIG. 1.
Figure 10:
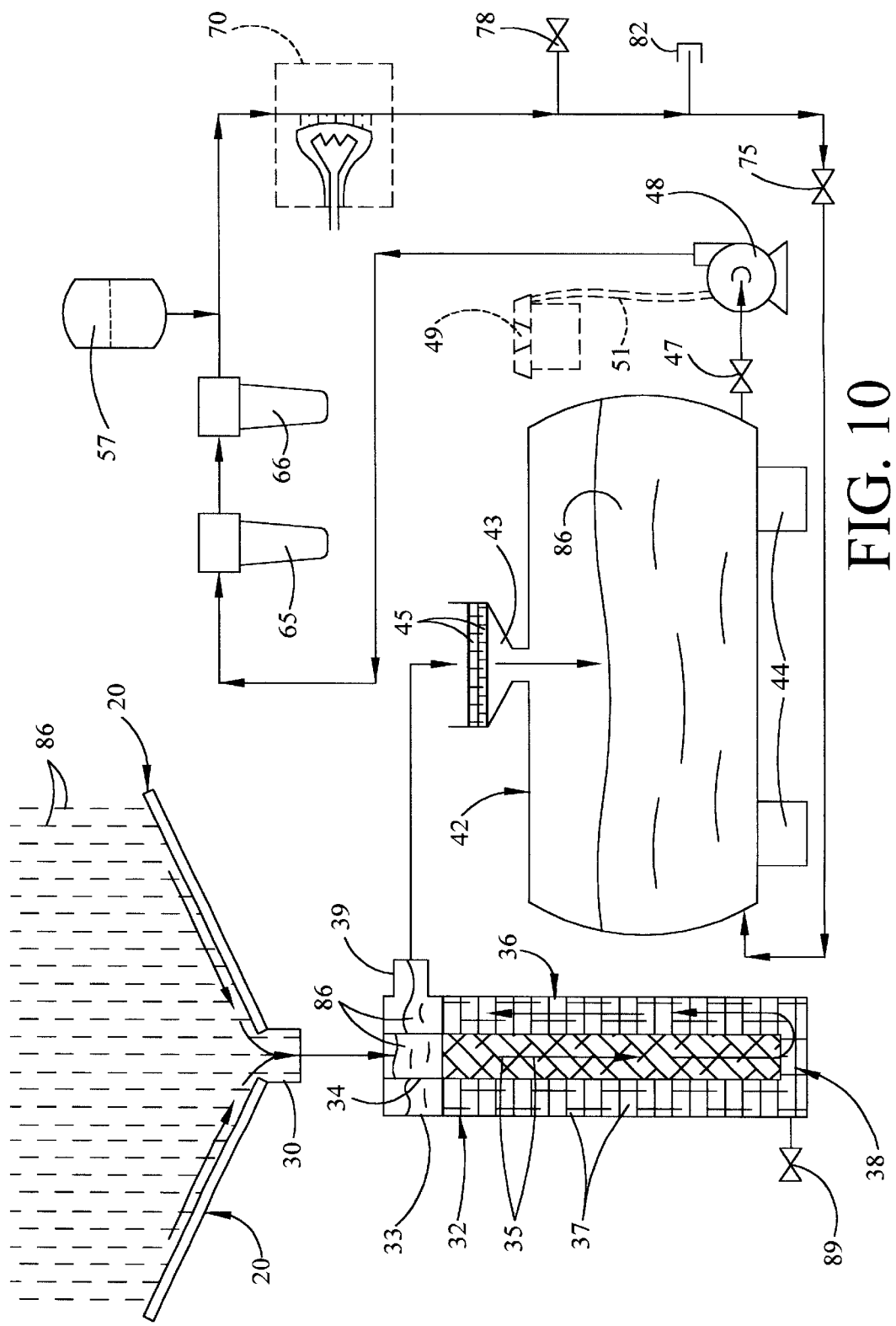
FIG. 10 is a schematic view of the various rainwater filtering and disinfecting components of the portable rainwater collecting and purifying system of this invention.

As illustrated in FIGS. 2, 4 and 5 of the drawings, an elongated, substantially rectangular rainwater collection panel 20 is pivotally mounted by means of the respective pairs of roof panel hinges 11, on the corresponding side of the system housing 2. As particularly illustrated in FIGS. 2 and 5, each rainwater collection panel 20 is characterized by a rectangular panel frame 21, spanned by a pair of parallel longitudinal frame members 22, and a pair of parallel transverse frame members 23, disposed in intersecting relationship with respect to the longitudinal frame members 22 in the panel frame 21. A runoff panel 24, typically constructed of tin and having multiple, parallel panel ridges 25 shaped therein, is mounted on the panel frame 21, longitudinal frame members 22 and transverse frame members 23 of the rainwater collection panel 20. As further illustrated in FIG. 2, the transverse frame members 23 of the rainwater collection panel 20 are inserted between the parallel hinge plates 11d of the respective roof panel hinges 11, and are typically welded or otherwise secured to the hinge plates 11d. Accordingly, the rainwater collection panel 20 is capable of pivoting on the respective roof panel hinges 11, between the vertical storage or transport configuration on the corresponding side of the system housing 2 as illustrated in FIG. 5, and the functionally-deployed, sloped configuration on the system housing 2, as illustrated in FIGS. 1 and 2. Each rainwater collection panel 20 is removably supported in the sloped, rainwater-collecting configuration typically by means of a pair of elongated panel support members 13, each of which is terminated by a support member flange 13a as illustrated in FIG. 4. Accordingly, a support pin 12b is removably extended through a pin opening (not illustrated), provided in one of the support member flanges 13a, and through a registering pin opening 12a (FIG. 9), provided in the corresponding panel support flange 12 of the system housing 2. A second support pin 12b is extended through the pin opening (not illustrated) provided in the other support member flange 13a of each panel support member 13, and through the registering pin opening (not illustrated), provided in a frame flange 23a which extends downwardly from the underside of the rainwater collection panel 20, at the junction of each longitudinal frame member 22 and transverse frame member 23, as illustrated in FIG. 4. When the rainwater collection panels 20 are so deployed in the sloped, functional configuration on the system housing 2, each sloped rainwater collection panel 20 is supported by the corresponding horizontal frame member 7 (FIG. 8) and respective angled gutter support arms 8a, on each side of the housing frame 3, and the lower edge 20a of each rainwater collection panel 20 is disposed along the water collection gutter 30, as illustrated in FIG. 1. The rainwater collection panels 20 are thus positioned to collect rainwater 86 or other precipitation falling on the rainwater collection panels 20, as illustrated in FIG. 10 and hereinafter described.

Figure 11:
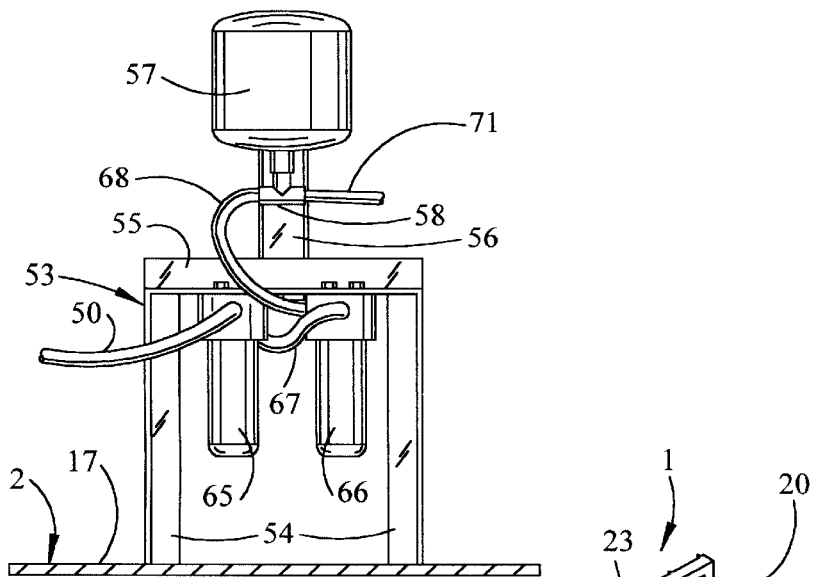
FIG. 11 is a front view of the particle filter components of the portable rainwater collecting and purifying system, with the particle filters mounted on a common filter support frame, provided in the housing.

Referring again to FIGS. 1 and 7–10 and to FIG. 11 of the drawings, an elongated water collection gutter 30 is mounted between the two pairs of adjacent gutter support arms 8a at the respective ends of the housing frame 3, as illustrated in FIG. 8, and disposed between the functionally-deployed, sloped rainwater collection panels 20, as illustrated in FIG. 1 for receiving rainwater 86 from the rainwater collection panels 20, as illustrated in FIG. 10 and hereinafter further described. As further illustrated in FIG. 8, a gutter drain 30a extends downwardly from confluent attachment to the collection gutter 30 at substantially the midpoint thereof, and is connected to one end of an elongated gutter drain pipe 31, typically by means of an elbow 30b. The opposite end of the gutter drain pipe 31 is mounted in fluid communication with the upper end of an elongated, cylindrical standpipe 32, characterized by a typically cylindrical standpipe housing 33, mounted in vertical configuration in the system housing 2 as illustrated in FIG. 10. A cylindrical receiving pipe 34, the upper end of which is fitted in fluid communication with the gutter drain pipe 31 (FIG. 8), extends downwardly into the standpipe housing 33, in substantially concentric relationship thereto, and a water flow gap 38 is defined between the lower end of the receiving pipe 34 and bottom of the standpipe housing 33. At least one typically screen pipe filter 35, having a selected screen opening size, is typically fitted in the receiving pipe 34, and an additional typically screen housing filter or filters 37 may likewise be provided in the water flow annulus 36 between the receiving pipe 34 and standpipe housing 33 for filtering twigs, leaves and other large debris (not illustrated) from the rainwater 86 after the rainwater 86 enters the standpipe 32 from the water collection gutter 30 as hereinafter described. As illustrated in FIG. 7, a drain pipe 88, fitted with a drain valve 89 having a drain valve handle 90, typically extends from the standpipe housing 33, in fluid communication with the water flow annulus 36 and extends downwardly through the floor panel 17 of the system housing 2, terminating beneath the floor panel 17. Rainwater 86 can be selectively drained from the standpipe 32 and expelled beneath the system housing 2, through the drain pipe 88 by operation of the drain valve handle 90 of the drain valve 89, as needed. A water exit nipple 39, provided in confluent relationship to the water flow annulus 36 of the standpipe housing 33 as further illustrated in FIG. 10, receives one end of a substantially horizontal water exit pipe 40, as illustrated in FIGS. 8 and 9, the opposite end of which water exit pipe 40 terminates in a water collection hopper 43, provided on a typically 550-gallon water collection tank 42. The water collection tank 42 is supported on the floor panel 17 of the system housing 2, typically by means of a pair of tank cradles 44, and a gravity-flow water prefilter or prefilters 45 (FIG. 10), each typically characterized by an automotive air filter, is typically provided in the water collection funnel 43 for filtering large particulate impurities from the rainwater 86 as the rainwater 86 flows from the standpipe 32 and water exit pipe 40, into the water collection tank 42. As further illustrated in FIG. 9, tank drain tubing 46 exits the water collection tank 42 at or near the bottom thereof and terminates in the intake of a conventional, typically pressure-activated pump 48, typically powered by a 12-volt battery 49, as hereinafter described. The rainwater 86 exits the water collection tank 42 by gravity through the tank drain tubing 46, and the pump 48 pumps the rainwater 86 through the remaining filtering and disinfecting system components as hereinafter described. A unidirectional tank drain valve 47, typically fitted in the tank drain tubing 46, prevents backflow of rainwater 86 from the pump 48 to the water collection tank 42. Pump tubing 50 extends from the output of the pump 48 and, as illustrated in FIGS. 8 and 11, terminates in fluid communication with a typically 20-micron particle filter 65, mounted on a filter support frame 53 which is typically supported on the floor panel 17 of the system housing 2, as illustrated in FIG. 11. The filter support frame 53 is typically characterized by a pair of frame legs 54 which extend upwardly from the floor panel 17 in substantially parallel, spaced-apart relationship with respect to each other, and an elongated, horizontal filter support member 55 spans the upper ends of the frame legs 54, with the 20-micron particle filter 65 mounted on the filter support member 55. As further illustrated in FIG. 11, interfilter tubing 67 connects the 20-micron particle filter 65 in confluent relationship with a typically 5-micron particle filter 66, likewise mounted on the filter support member 55 of the filter support frame 53. The 20-micron particle filter 65 and 5-micron particle filter 66 may be any type of water filters capable of removing particles having a diameter of greater than 20 microns and 5 microns, respectively, from the rainwater 86. Typically, the 20-micron particle filter 65 and 5-micron particle filter 66 are those sold under the trademark ACE. A vertical tank support arm 56 extends upwardly from the filter support member 55, and a conventional precharged water tank 57 of selected volume and air pressure, preferably about 30 lbs. of air pressure, is typically mounted on the tank support arm 56, for purposes which will be hereinafter described. A tee 58, pneumatically connected to the precharged water tank 57, receives filter exit tubing 68 which extends from the output of the 5-micron particle filter 66. As further illustrated in FIG. 11, the tee 58 also receives sterilizer tubing 71, which connects the tee 58 of the precharged water tank 57 in confluent relationship to a conventional ultraviolet light sterilizer 70, such as that sold under the trademark PURA and described in U.S. Pat. No. 4,971,687, mounted typically on the floor panel 17 of the system housing 2, as illustrated in FIG. 8, for disinfecting the filtered and purified rainwater 86 from the 20-micron filter 65 and 5-micron filter 66.

As illustrated in FIG. 7, a header system 72, the purpose of which will be hereinafter described, includes header system piping 73 which extends from confluent attachment to the ultraviolet light sterilizer 70, and a circulation tee 74, fitted with a circulation valve 75 having a valve handle 75a for selectively opening and closing the circulation valve 75, is provided in the header system piping 73. As further illustrated in FIG. 7, circulation tubing 76 extends from the circulation tee 75, and terminates in fluid communication with the water collection tank 42, typically on the opposite end of the water collection tank 42 with respect to the tank drain tubing 46, as illustrated. The header system 72 typically further includes a system exit tee 77, provided in the header system piping 73 as illustrated in FIG. 7. An exit valve 78, fitted with a valve handle 79, is provided in the system exit tee 77, and exit piping 80 extends from confluent connection with the exit valve 78, typically through the side housing panel 16 of the system housing 2 for purposes which will be hereinafter further described. As further illustrated in FIG. 7, the header system piping 73 is typically further fitted with a faucet 82, located inside the system housing 2 and provided with a faucet handle 82a, for purposes which will be hereinafter further described.

Referring again to FIGS. 1, 4, 5 and 7–11 of the drawings, in typical application of the portable rainwater collecting and purifying system 1, the system housing 2 can be transported to a suitable location by towing the system housing 2 using a truck or other suitable towing vehicle (not illustrated), attached to the housing frame 3, with the skids 4 traversing sand, ice, snow or other soft terrain, typically in a remote or arid area where rainfall or other precipitation is scarce. Alternatively, the system housing 2 can be carried on a trailer or truck (not illustrated). In military operations or natural disasters, the portable rainwater collecting and purifying system 1 can be delivered to a desired location by air-dropping the portable rainwater collecting and purifying system 1 from an airplane (not illustrated), using a parachute (also not illustrated). Accordingly, the portable rainwater collecting and purifying system 1 is typically transported with the rainwater collection panels 20 deployed in the nonfunctional configuration on the respective sides of the system housing 2, as illustrated in FIG. 5. After the portable rainwater collecting and purifying system 1 has been transported to the desired location, the rainwater collection panels 20 are deployed and supported by means of the respective pairs of panel support members 13 in the functional, sloped configuration on the top of the system housing 2, as illustrated in FIG. 1. This is accomplished by initially pivoting each rainwater collection panel 20 upwardly on the corresponding pair of roof panel hinges 11 on the corresponding side of the system housing 2, and connecting the panel support members 13 to the panel support flanges 12 of the system housing 2 and frame flanges 23a of the rainwater collection panels 20, by means of the respective support pins 12b as heretofore described with respect to FIG. 4.

As the rainwater collection panels 20 remain deployed in the sloped configuration illustrated in FIG. 1, rainwater 86 which falls on the sloped rainwater collection panels 20, as illustrated in FIG. 10, is pulled downwardly by gravity on the upper surfaces of the respective rainwater collection panels 20, between the panel ridges 25 (FIG. 1) as indicated by the arrows in FIG. 10. The rainwater 86 falls from the rainwater collection panels 20 into the water collection gutter 30, where the rainwater 86 leaves the water collection gutter 30 through the gutter drain 30a (FIG. 8). The rainwater 86 enters the central receiving pipe 34 of the vertical standpipe 32, as indicated in FIG. 10, from the water collection gutter 30 through the gutter drain pipe 31 (connected to the gutter drain 30a, FIG. 8). The rainwater 86, once inside the receiving pipe 34, percolates downwardly through the typically screen pipe filter or filters 35 in the receiving pipe 34, and flows through the water flow gap 38 between the lower end of the receiving pipe 34 and bottom of the standpipe housing 33, where the accumulating rainwater 86 rises upwardly through the optional, typically screen housing filter or filters 37 in the water flow annulus 36 of the standpipe housing 32, as illustrated. The pipe filters 35 and optional housing filters 37 remove twigs, leaves and other large debris and particulate contaminants from the rainwater 86, the size of the removed debris depending on the selected porosity or screen size of the pipe filter or filters 35 and housing filter or filters 37. When the rainwater 86 in the water flow annulus 36 rises to the level of the water exit nipple 39 (provided in fluid communication with the water flow annulus 36), the partially-filtered rainwater 86 overflows from the standpipe 32, through the water exit nipple 39 and into the water exit pipe 40 (FIG. 8). The water exit pipe 40 drains the rainwater 86 into the water collection tank 42, through the water collection hopper 43, where large particulate impurities are typically removed from the rainwater 86 by means of the gravity flow prefilter or prefilters 45, disposed in the water collection hopper 43 as illustrated in FIG. 10, before the rainwater 86 falls into the water collection tank 42. The rainwater 86 accumulated in the water collection tank 42 is drained by gravity from the water collection tank 42 into the tank drain tubing 46 (FIG. 9), where the pump 48 continually pumps the rainwater 86 from the tank drain tubing 46 to the 20-micron particle filter 65 through the pump tubing 50, as long as the water pressure in the pump tubing 50 remains in the preset operating range of the pump 48, typically between 40 lbs. and 60 lbs. of water pressure. The 20-micron particle filter 65 removes substantially all particulate contaminants which exceed 20 microns in size, from the rainwater 86. The filtered rainwater 86 is continually pumped from the 20-micron particle filter 65, through the interfilter tubing 67 (FIG. 11) to the 5-micron particle filter 66, which removes substantially all particulate contaminants which exceed 5 microns in size, from the rainwater 86. Thus, substantially all dust, dirt, and undesired microscopic particulate contaminants are removed from the rainwater 86 by means of the 20-micron particle filter 65 and 5-micron particle filter 66. Upon leaving the 5-micron filter 66 through the filter exit tubing 68, the rainwater 86 flows through the tee 58 and into the precharged water tank 57, containing a preselected air pressure, typically about 30 lbs. Accordingly, as the pump 48 pumps the rainwater 86 from the tank drain tubing 46 (FIG. 9) and through the 20-micron particle filter 65, 5-micron particle filter 66 and tee 58 and into the precharged water tank 57, the precharged water tank 57 pumps the rainwater 86 through the tee 58 and the sterilizer tubing 71. Consequently, water pressure in the pump tubing 50 falls below the preset operating range of the pump 48, typically about 40 lbs. as heretofore noted, and operation of the pump 48 is temporarily terminated. The precharged water tank 57 thus prevents continuous operation of the pump 48, reducing running time of the pump 48 typically by about 50 percent, and saves power from the battery 49. The rainwater 86 is distributed to the ultraviolet light sterilizer 70 through the sterilizer tubing 71, which ultraviolet light sterilizer 70 is typically energized by an extraneous power source (not illustrated) and kills substantially all bacteria, fungi and other harmful microorganisms in the filtered rainwater 86.

Finally, the purified and disinfected rainwater 86 leaves the ultraviolet light sterilizer 70 through the header system piping 73 (FIG. 7) of the header system 72. It will be appreciated by those skilled in the art that the rainwater 86 can be re-circulated through the system 1, as desired, under circumstances in which the rainwater 86 remains in the water collection tank 42 and other system components for an extended period of time and begins to stagnate, for example, and additional filtering of the rainwater 86 thus becomes necessary. This is accomplished by opening the circulation valve 75 (FIG. 7) by operation of the valve handle 75a. Accordingly, the treated rainwater 86 is continually distributed throughout the portable water collecting and treatment system 1, from the header system piping 73, through the open circulation valve 75 and circulation tubing 76, water collection tank 42, pump 48, 20-micron filter 65, 5-micron filter 66, ultraviolet light sterilizer 70, and back into the header system piping 73, as long as the circulation valve 75 remains open. Alternatively, by opening the exit valve 78 of the system exit tee 77 by operation of the valve handle 79, the filtered and disinfected rainwater 86 can be distributed from the header system tubing 73, through the open exit valve 78, from the system housing 2 through the exit piping 80 and to a residence (not illustrated) or other destination, as desired, according to the knowledge of those skilled in the art. Further in the alternative, the filtered and disinfected rainwater 86 can be discharged from the header system piping 73 by opening the faucet 82 using the faucet handle 82a. As illustrated in FIG. 7, the pump battery 49, 5-micron filter 65, 20-micron filter 66, ultraviolet light sterilizer 70 and header system 72 are typically positioned in the system housing 2 such that these components can be accessed through the door 18 of the system housing 2, as needed.

Referring next to FIG. 3 of the drawings, in another embodiment of the portable water collecting and purifying system 1, multiple, conventional solar panels 28 are mounted on the runoff panels 24 of the respective rainwater collection panels 20, and are wired to the pump 48 (FIG. 9), ultraviolet light sterilizer 70 (FIG. 8), or both, according to the knowledge of those skilled in the art, for collecting solar energy which powers either or both of these components in conjunction with or instead of the pump battery 49. The solar panels 28, coated by a water-resistant transparent glass or plastic material (not illustrated), receive falling rainwater 86 and drain the rainwater 86 into the water collection gutter 30, in the same manner as described above with respect to FIG. 10.

Referring next to FIG. 6 of the drawings, in still another embodiment of the portable water collecting and purifying system 1 a conventional, typically electric-powered heating blanket 26, fitted with an electric heating coil 27, is mounted on the bottom surface of each rainwater collection panel 20, according to the knowledge of those skilled in the art. The heating blanket 26, typically energized by solar power collected by the solar panels 28 (FIG. 3) or by means of an extraneous power source (not illustrated), are selectively operated to heat the metal runoff panels 24 of the collection panels 20 and melt snow, sleet, or ice which accumulates on the upper surfaces of the collection panels 20, in freezing weather or climates. Accordingly, the melted snow, sleet, or ice runs off the sloped rainwater collection panels 20 and into the water collection gutter 30, and is filtered and disinfected through the portable water collecting and purifying system 1, as heretofore described with respect to the rainwater 86. Under such circumstances in which the portable water collecting and purifying system 1 is used in cold weather or climates, a heater 84, typically energized by a battery (not illustrated), the solar panels 28 or an extraneous power source (not illustrated), can be provided in the system housing 2 as illustrated in FIGS. 7–9, in order to prevent freezing of the purified water inside the system housing 2.

Figure 12:
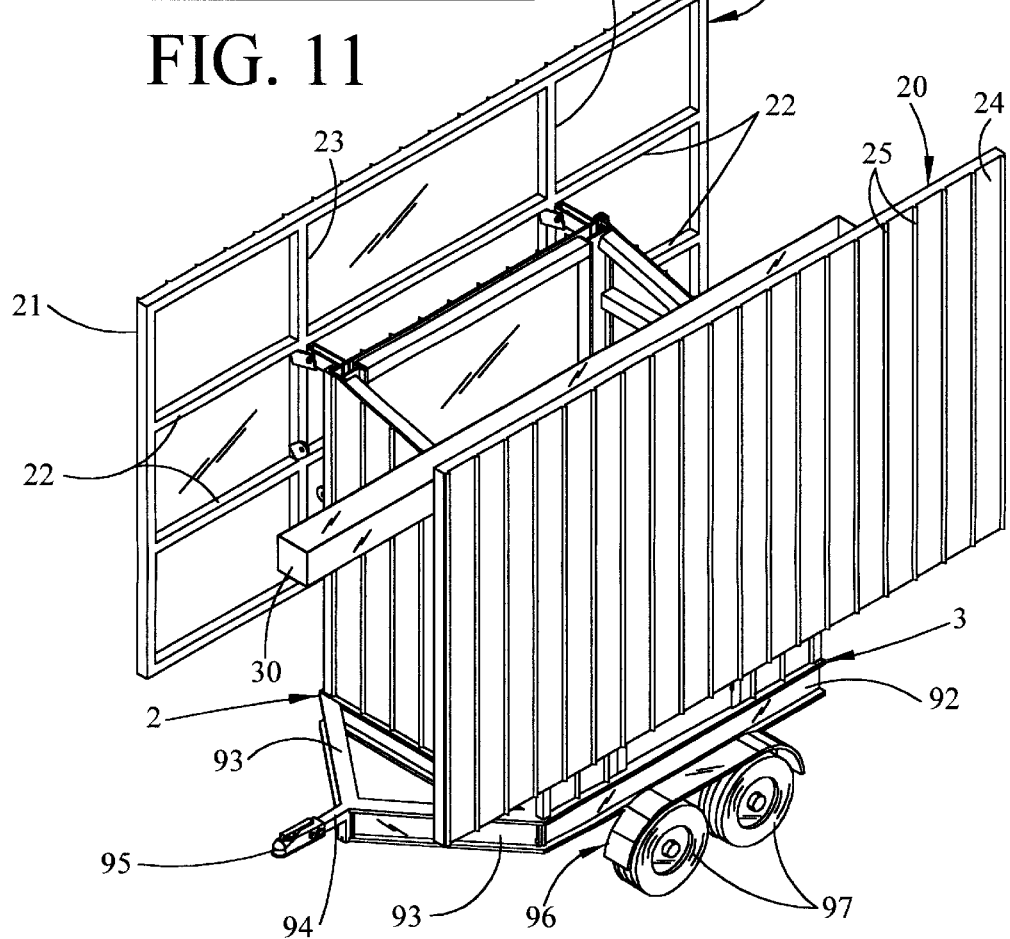
FIG. 12 is a perspective view of yet another embodiment of the portable rainwater collecting and purifying system, more particularly illustrating a tandem wheel assembly mounted on each side of the system housing.

Referring next to FIG. 12 of the drawings, in yet another embodiment of the portable water collecting and treatment system 1 the skids 4 (FIG. 8) of the housing frame 3 are replaced by a pair of side frame members 92. A hitch support member 93 angles forwardly from each side frame member 92, and each hitch support member 93 joins the other hitch support member 93 at the front end thereof. A hitch arm 94 extends forwardly from the apex of the hitch support members 93 and a conventional hitch 95 is provided on the hitch arm 94 for removable hitching to a hitch ball (not illustrated) of a towing vehicle. A tandem wheel unit 96 having a pair of wheels 97 is mounted on each side frame member 92 of the housing frame 3, in conventional fashion for rendering the system housing 2 portable on pavement or hard terrain. Accordingly, the portable water collecting and treatment system 1 can be transported, as desired, by removably hitching the hitch 95 to a hitch ball (not illustrated), provided on a truck or other towing vehicle (not illustrated), and towing the system housing 2 behind the vehicle, in conventional fashion.

It will be appreciated by those skilled in the art that the portable water collecting and purifying system of this invention is lightweight, easily transported and effective for collecting, filtering and disinfecting rainwater or other precipitation in rural or underdeveloped areas where suitable drinking water is scarce. Furthermore, although the pumping system is primarily battery-operated, it will be appreciated that other types of pumps may be used when the system requires a greater water flow and where power is available. An important feature of the portable water collecting and purifying system is the rainwater collection panels which are capable of being stored on respective sides of the system housing during transport of the portable water collecting and treatment system, and which can be disposed in the sloped configuration on the system housing for collecting falling rainwater or other precipitation, as heretofore described. Another important feature of the portable water collecting and purifying system is the capability of selectively recirculating water through the system under circumstances in which rainwater or other precipitation in the rainwater collection tank and other system components settles for an extended period of time and begins to stagnate. It is understood that the system housing is capable of being permanently attached to a residence or other building for collecting rainwater and the rainwater collection panels permanently mounted in the sloped, rainwater-collecting configuration according to the knowledge of those skilled in the art, as desired. Moreover, the 20-micron filter, 5-micron filter and ultraviolet light sterilizer can be replaced in the system housing by filters of any number and design which are known to those skilled in the art and are capable of filtering and disinfecting rainwater or other precipitation and rendering the water suitable for drinking.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A water collecting and purifying system for collecting and purifying water, said system comprising a portable system housing; at least one water collection panel carried by said system housing for receiving the water, said at least one water collection panel capable of being selectively positioned in a storage position and a functional, water-collecting position; a water collection tank provided in said system housing for collecting the water from said at least one water collection panel; and at least one filter provided in said system housing in fluid communication with said water collection tank for receiving the water from said water collection tank and filtering the water.

2. The system of claim 1 comprising a pump provided in fluid communication with said water collection tank and said at least one filter for pumping the water from said water collection tank through said at least one filter.

3. The system of claim 1 wherein said at least one water collection panel comprises a pair of water collection panels carried by said system housing for receiving the water.

4. The system of claim 3 comprising a pump provided in fluid communication with said water collection tank and said at least one filter for pumping the water from said water collection tank through said at least one filter.

5. The system of claim 1 comprising a standpipe provided in said system housing in fluid communication with said water collection tank for receiving the water from said system housing and at least one pipe filter provided in said standpipe for filtering the water.

6. The system of claim 5 comprising a pump provided in fluid communication with said water collection tank and said at least one filter for pumping the water from said water collection tank through said at least one filter.

7. The system of claim 5 wherein said at least one water collection panel comprises a pair of water collection panels carried by said system housing for receiving the water.

8. The system of claim 7 comprising a pump provided in fluid communication with said water collection tank and said at least one filter for pumping the water from said water collection tank through said at least one filter.

9. The system of claim 1 comprising an ultraviolet light sterilizer provided in fluid communication with said at least one filter for receiving the water from said at least one filter and substantially disinfecting the water.

10. The system of claim 9 comprising a pump provided in fluid communication with said water collection tank and said at least one filter for pumping the water from said water collection tank through said at least one filter.

11. The system of claim 9 wherein said at least one water collection panel comprises a pair of water collection panels carried by said system housing for receiving the water.

12. The system of claim 11 comprising a pump provided in fluid communication with said water collection tank and said at least one filter for pumping the water from said water collection tank through said at least one filter.

13. The system of claim 9 comprising a standpipe provided in said system housing in fluid communication with said water collection tank for receiving the water from said system housing, and at least one pipe filter provided in said standpipe for filtering the water.

14. The system of claim 13 comprising a pump provided in fluid communication with said water collection tank and said at least one filter for pumping the water from said water collection tank through said at least one filter.

15. The system of claim 13 wherein said at least one water collection panel comprises a pair of water collection panels carried by said system housing for receiving the water and pouring the water into said standpipe.

16. The system of claim 15 comprising a pump provided in fluid communication with said water collection tank and said at least one filter for pumping the water from said water collection tank through said at least one filter.

17. A portable water collecting and purifying system for collecting, filtering and disinfecting water, said system comprising a system housing; a pair of water collection panels carried by said system housing for receiving the water and a water collection gutter carried by said system housing between said water collection panels for receiving the water from said pair of water collection panels; a standpipe provided in said system housing for receiving the water from said water collection gutter and at least one pipe filter fitted in said standpipe for filtering the water; a water collection tank provided in said system housing in fluid communication with said standpipe for receiving the water from said standpipe; a pair of filters provided in said system housing in fluid communication with said water collection tank for receiving the water from said water collection tank and filtering the water; an ultraviolet light sterilizer provided in said system housing in fluid communication with said pair of filters for receiving the water from said pair of filters and substantially disinfecting the water; and a pump provided in said system housing in fluid communication with said water collection tank and said pair of filters for pumping the water from said water collection tank through said pair of filters and said ultraviolet light sterilizer.

18. The system of claim 17 comprising a faucet provided in fluid communication with said ultraviolet light sterilizer for selectively discharging the water from said ultraviolet light sterilizer.

19. The system of claim 17 comprising a system exit valve provided in fluid communication with said ultraviolet light sterilizer for selectively distributing the water from said system housing.

20. The system of claim 19 comprising a faucet provided in fluid communication with said ultraviolet light sterilizer for selectively discharging the water from said ultraviolet light sterilizer.

21. The system of claim 17 comprising a circulation valve provided in fluid communication with said ultraviolet light sterilizer and said water collection tank for selectively distributing the water from said ultraviolet light sterilizer to said water collection tank.

22. The system of claim 21 comprising a faucet provided in fluid communication with said ultraviolet light sterilizer for selectively discharging the water from said ultraviolet light sterilizer.

23. The system of claim 22 comprising a system exit valve provided in fluid communication with said ultraviolet light sterilizer for selectively distributing the water from said system housing.

24. The portable water collecting and filtering system of claim 17 comprising a pair of skids provided on said system housing.

25. The system of claim 24 comprising a faucet provided in fluid communication with said ultraviolet light sterilizer for selectively discharging the water from said ultraviolet light sterilizer.

26. The system of claim 25 comprising a system exit valve provided in fluid communication with said ultraviolet light sterilizer for selectively distributing the water from said system housing.

27. The system of claim 26 comprising a circulation valve provided in fluid communication with said ultraviolet light sterilizer and said water collection tank for selectively distributing the water from said ultraviolet light sterilizer to said water collection tank.

28. The system of claim 17 comprising solar panels provided on said water collection panels for energizing said ultraviolet light sterilizer.

29. The system of claim 28 comprising a faucet provided in fluid communication with said ultraviolet light sterilizer for selectively discharging the water from said ultraviolet light sterilizer.

30. The system of claim 29 comprising a system exit valve provided in fluid communication with said ultraviolet light sterilizer for selectively distributing the water from said system housing.

31. The system of claim 30 comprising a circulation valve provided in fluid communication with said ultraviolet light sterilizer and said water collection tank for selectively distributing the water from said ultraviolet light sterilizer to said water collection tank.

32. The system of claim 17 comprising a plurality of wheels provided on said system housing.

33. A portable water collecting and purifying system for collecting, filtering and disinfecting water, said system comprising a system housing; a pair of water collection panels carried by said system housing for receiving the water, a heating blanket carried by said water collection panels, respectively, and a water collection gutter carried by said system housing between said water collection panels for receiving the water from said pair of water collection panels; a standpipe provided in said system housing for receiving the water from said water collection gutter and at least one pipe filter fitted in said standpipe for filtering the water; a water collection tank provided in said system housing in fluid communication with said standpipe for receiving the water from said standpipe; a pair of filters provided in said system housing in fluid communication with said water collection tank for receiving the water from said water collection tank and filtering the water; an ultraviolet light sterilizer provided in said system housing in fluid communication with said pair of filters for receiving the water from said pair of filters and substantially disinfecting the water; and a pump provided in said system housing in fluid communication with said water collection tank and said pair of filters for pumping the water from said water collection tank through said pair of filters and said ultraviolet light sterilizer.

34. The system of claim 33 comprising a faucet provided in fluid communication with said ultraviolet light sterilizer for selectively discharging the water from said ultraviolet light sterilizer.

35. The system of claim 34 comprising a system exit valve provided in fluid communication with said ultraviolet light sterilizer for selectively distributing the water from said system housing.

36. The system of claim 35 comprising a circulation valve provided in fluid communication with said ultraviolet light sterilizer and said water collection tank for selectively distributing the water from said ultraviolet light sterilizer to said water collection tank.

* * * * *